UNITED STATES PATENT OFFICE.

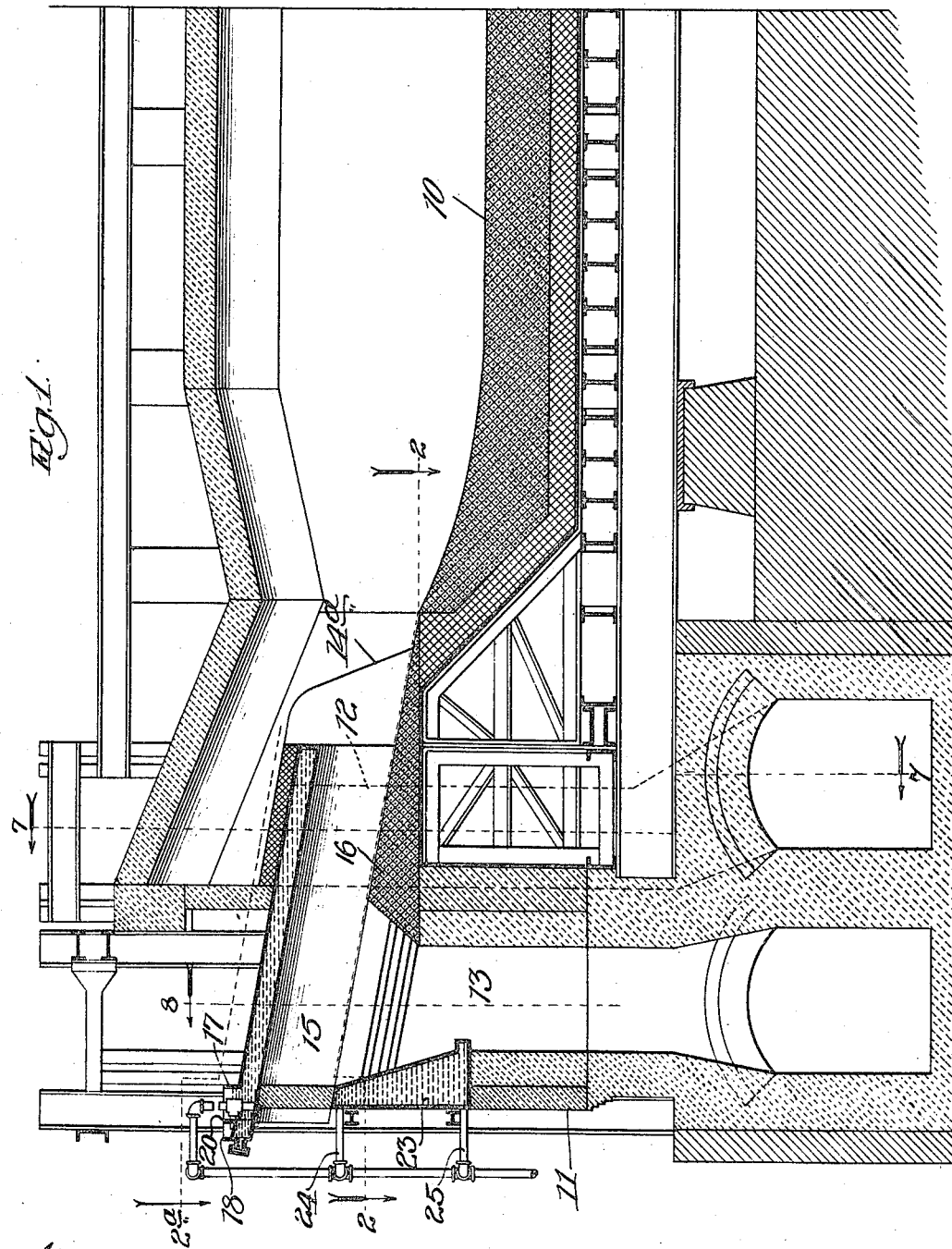

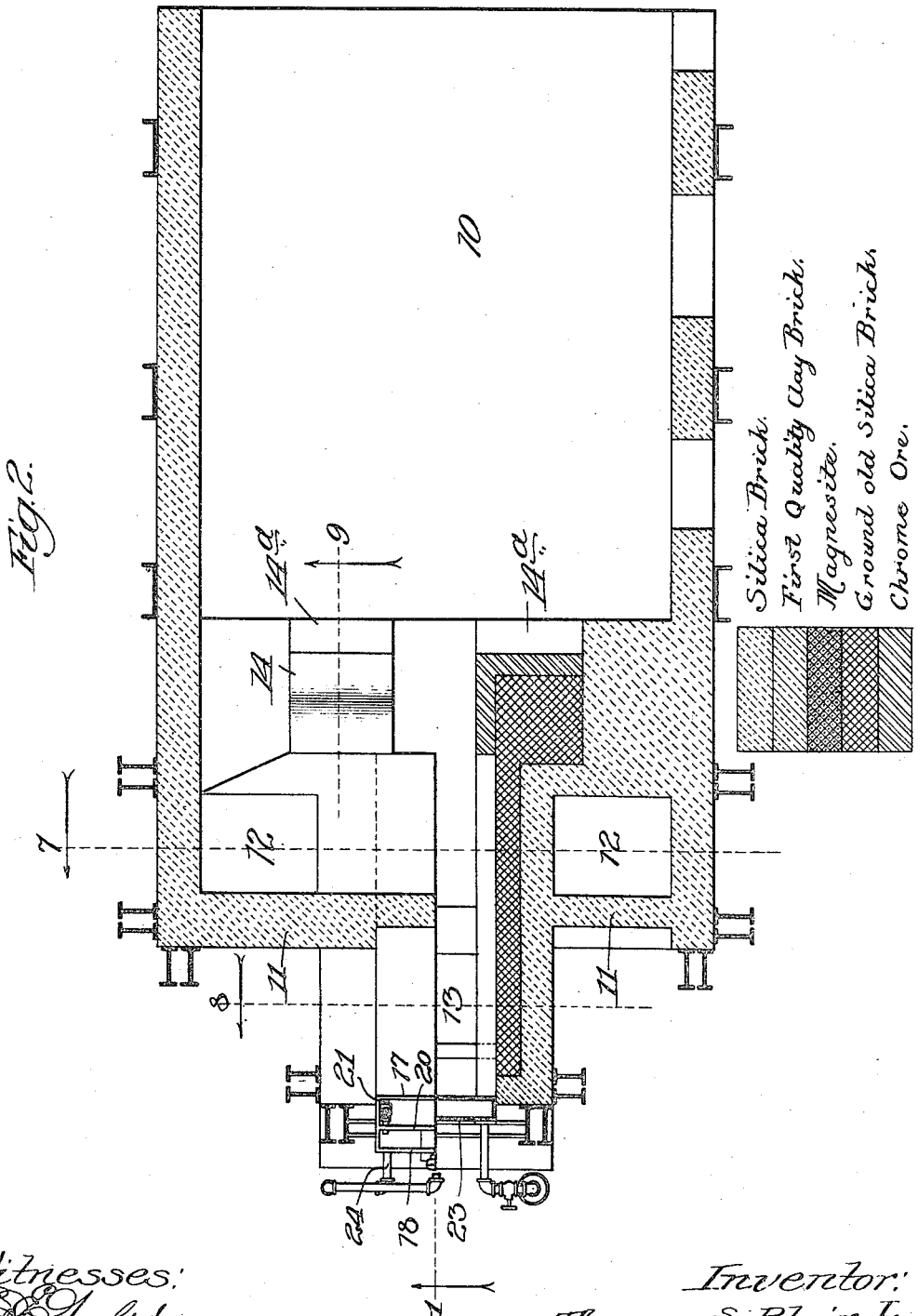

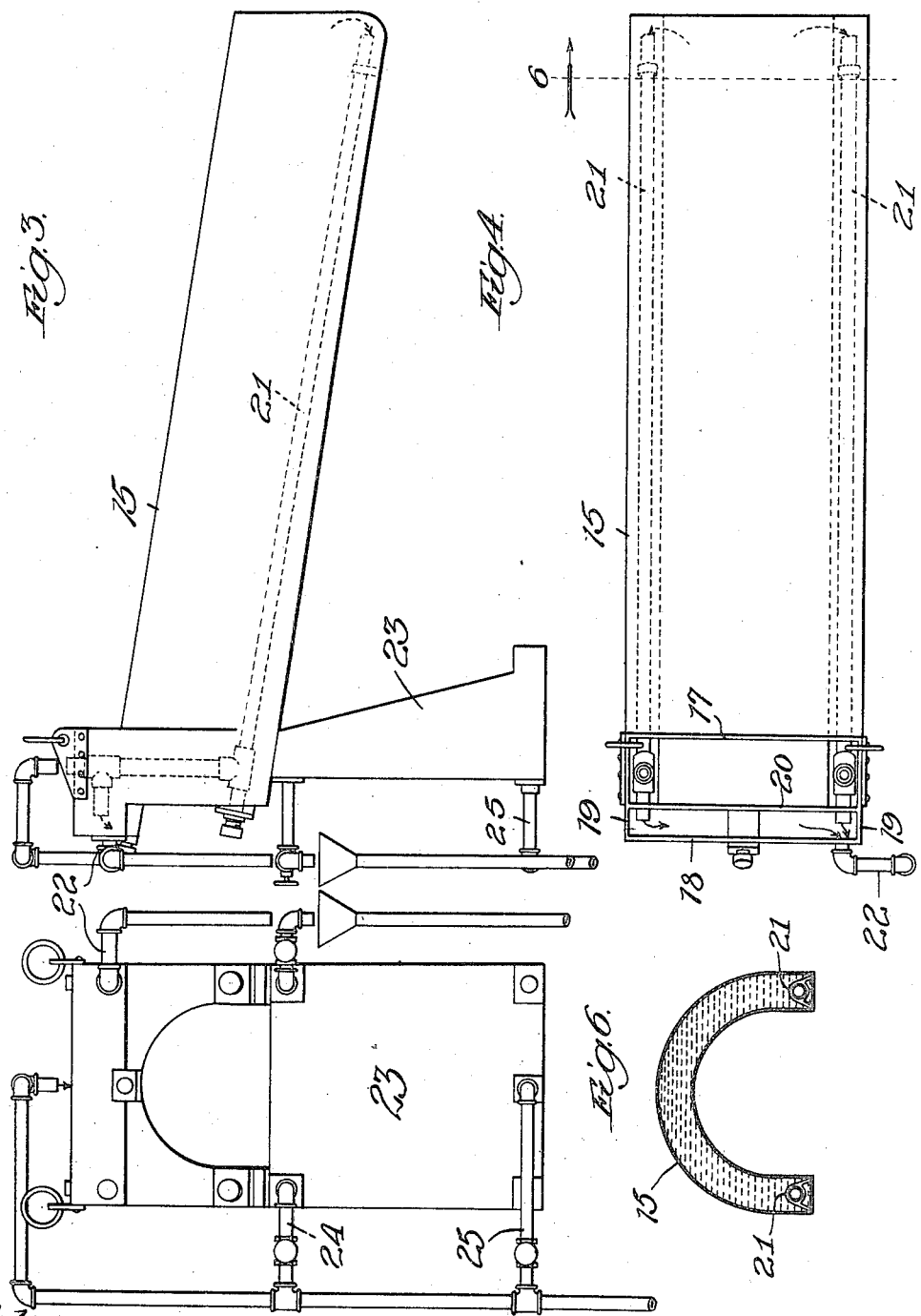

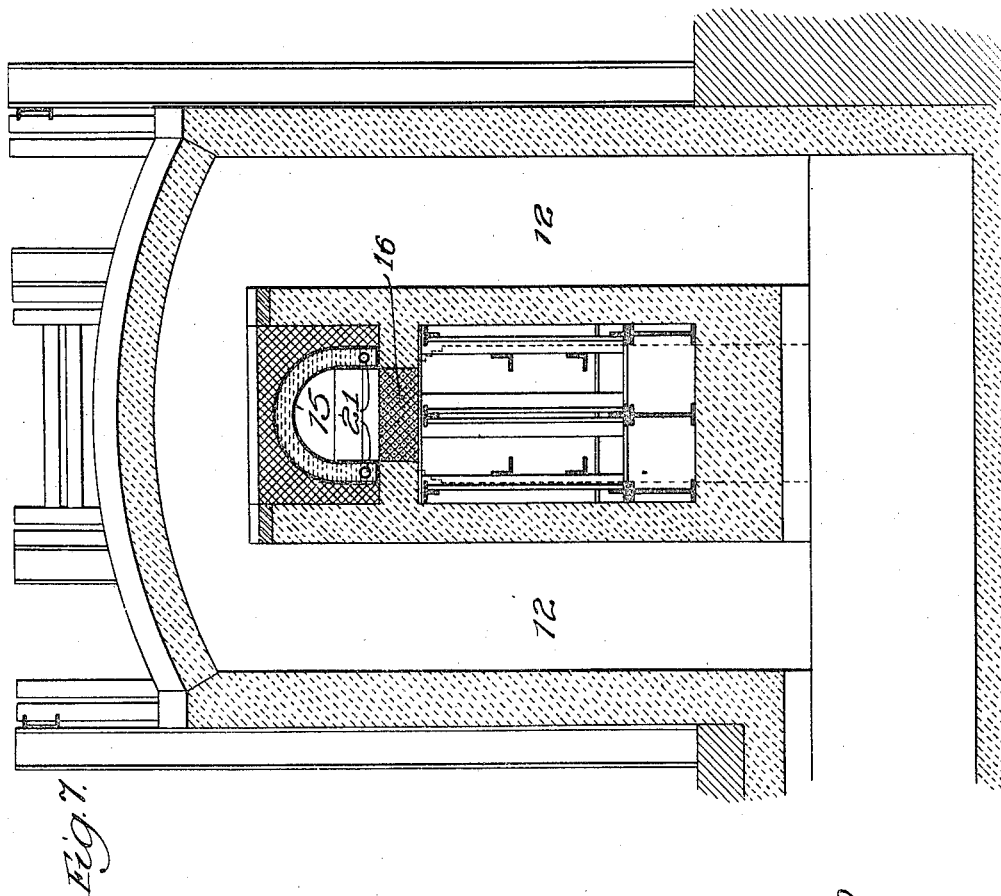
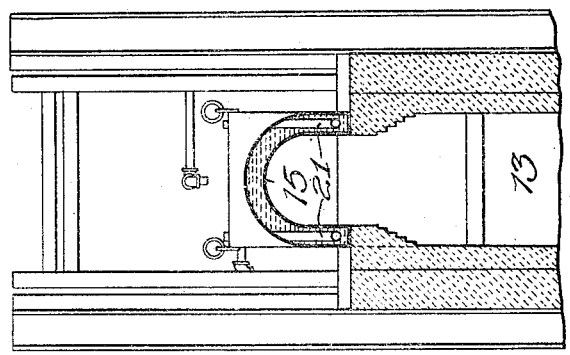
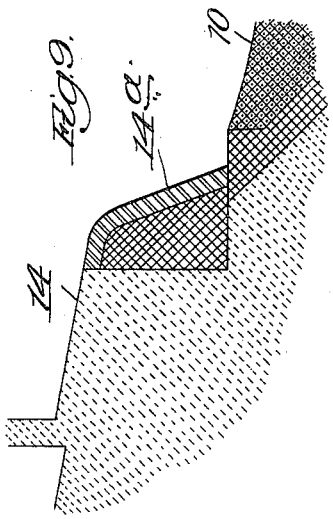

THOMAS S. BLAIR, JR., OF CHICAGO, ILLINOIS, ASSIGNOR TO BLAIR ENGINEERING COMPANY, OF NEW YORK, N. Y., A CORPORATION OF NEW YORK.

OPEN-HEARTH FURNACE.

1,236,140. Specification of Letters Patent. Patented Aug. 7, 1917.

Application filed September 12, 1916. Serial No. 119,689.

*To all whom it may concern:*

Be it known that I, THOMAS S. BLAIR, Jr., a citizen of the United States, residing at Chicago, in the county of Cook and State of Illinois, have invented a new and useful Improvement in Open-Hearth Furnaces, of which the following is a specification.

My invention relates to certain new and useful improvements in an open-hearth furnace, and is fully described and explained in the specification shown in the accompanying drawings, in which—

Figure 1 is a longitudinal section through my improved furnace on the line 1 of Fig. 2; Fig. 2 is a transverse section, the lower half on the line 2 of Fig. 1, and the upper half on the line 2ª of Fig. 1; Fig. 3 is a side elevation of the gas port cover; Fig. 4 is a top plan of the same; Fig. 5 is an end view of the same; Fig. 6 is a section on the line 6 of Fig. 4; Fig. 7 is a section on the line 7 of Figs. 1 and 2; Fig. 8 is a section on the line 8 of Figs. 1 and 2; and Fig. 9 is a section on the line 9 of Fig. 2.

It has long been appreciated that it is undesirable to employ acid or silica blocks in basic open-hearth furnaces such as are now the standard type. The advantages inherent in basic blocks have heretofore been attained through the medium of the construction which I have invented and patented (Reissue No. 12,939, April 13, 1909), and which is generally known as the Blair port. In that construction the blocks are built of magnesite, this being made possible by the employment of the hollow metal hood forming the covering for the entire port. The recent scarcity of magnesite has made that form of construction very expensive, and it has become necessary to devise another form of construction to obtain the advantages inherent in practically indestructible blocks in a basic furnace without the employment of magnesite. The attainment of this end was the prime purpose for the building of open-hearth furnaces according to the plan here shown, but upon operating said furnaces they were found to have other and peculiar advantages, so that the furnace herein illustrated and described is not only a thoroughly durable furnace and totally devoid of magnesite in its blocks, but is also more efficient even than the prior furnaces equipped with the usual form of Blair port, for reasons which will hereafter appear.

In the drawings I have shown the furnace with a key to the cross-hatching of the sections, so as to show graphically the materials employed in construction, the employment of particular materials being of the utmost importance in a technical chemical process such as that commonly practised in the making of open-hearth steel. Referring to the drawings, the hearth is shown at 10, this being built up in the ordinary manner of basic material. In accordance with common practice the bottom will be magnesite, when that is available, and when it is not available, as in some plants during the present magnesite shortage, the bottom will be made of dolomite. 11 is the end wall of the furnace and 12 the air down-takes which are located, in accordance with common practice, at the two rear corners of the furnace structure. The furnace here illustrated is of the well-known "dog-house" type, that is to say the gas down-take, indicated by 13, is located beyond the end wall, completely surrounded by independent walls and having access to the furnace through a central opening in the end wall. The block 14 extends from the hearth line to the end wall at the level of the perforation in the end wall through which the gas-port enters. This block was commonly made of solid magnesite in the Blair port construction, and, in the present instance, is made of ground silica brick, its front inclined face, adjacent to the hearth, being provided with a facing 14ª three or four inches deep of chrome ore, which is substantially neutral chemically, and will neither flux with the silica nor be fluxed by the basic slag. This covering of chrome ore is carried up high enough to prevent any possibility of the basic slag reaching the acid material of which the block is formed.

The gas-port, following common practice, extends centrally through the material of the block, and since in a basic furnace no refractory material can be satisfactorily employed for covering the port, and since, further, the side walls of a gas-port cut in a block of silica disintegrate with extreme rapidity in a basic furnace, I inclose the gas-port on its top and both sides with a hollow metal structure, or hood, 15, the bottom of the port being formed of a magnesite body 16. The hood 15 in cross-section is of an inverted U or arched shape, as preferably built, and when so made possesses certain advantages which will presently appear.

But, broadly speaking, whatever the precise cross-section adopted may be, the present structure is exceedingly desirable and efficient. In the first place, the blocks themselves are entirely protected from attack by the basic slag, even though made of silica brick, by the chrome ore facing on the front and by the vertical walls of the hollow metal hood forming the lining of the gas-port. In operation the slag frequently boils up into the port-opening and in a very brief time would disintegrate the exposed silica brick of the side walls, while this lining by its water-cooled metal affords a complete protection. In one respect this structure has been found to be superior even to the Blair port structure with basic or magnesite blocks, because the magnesite of that structure is more or less friable and the vertical walls of the port are necessarily more or less disintegrated. Therefore, even with the Blair port, which disintegrates far less than a port cut in silica brick, the port has to be made quite long in order to give the gas current the proper direction. With the present structure, on the contrary, not only is the top of the port permanent in form and position, but the side walls as well are absolutely unchanging, and an exceedingly short port, therefore, can be used. It has been found practicable to operate an open-hearth furnace constructed according to my present invention, with the gas-port terminating only a few inches in front of the forward edge of the air down-takes. This not only cuts down the cooling effect of the hood to the minimum, but by starting the combustion well back from the hearth line, it produces the best possible conditions for efficient operation, and, therefore, the present furnace has been found to be even faster than the furnace equipped with the ordinary form of Blair port.

I am aware that it has heretofore been proposed to employ water-cooled structures for cooling ports lined on all sides with silica, and in some cases these structures have borne a superficial resemblance to my present structure, in that they embody a water-cooled port-cover with depending sides, but the structures to which I allude have all been provided with silica brick linings inside the water-cooled structures both at the top and on the two sides of the gas-port, so that the immediate lining of the gas port was acid silica brick on all its sides. In such structures the brick lining of the port is not only rapidly fluxed out by the molten basic slag, but in addition the differential expansion and contraction of the brick, due to its contact with the water-cooled structure, leads to its disintegration, so that the port, if properly designed at the beginning of a run to produce the best combustion, soon loses its form and is much less efficient. In other words, these structures to which I allude endeavor to prolong the life of a silica brick port, whereas my present furnace operates upon an entirely different principle, in that the port is made of precisely the right size and shape, and its permanence is guaranteed because its walls are formed of metal, and, therefore, it will last indefinitely. I am then enabled to build the block of the cheapest and most available material. In fact, I have made the material of the block a matter of entire inconsequence, and at the present time, when magnesite is unavailable, I have displaced very large quantities of it by refuse silica brick, and have attained a result even superior to that heretofore known.

The detailed structure of the U-shaped port-covering 15 is best shown in Figs. 3, 4, 5 and 6. The covering is provided with parallel inner and outer walls forming two depending legs, and its inner end, of course, inclines downwardly toward the hearth to give the flame the proper direction. The two ends of the covering are inclosed by plates, and the covering at its outer end is open at the top, as shown in Fig. 4, vertical flanges 17, 18 and 19 inclosing the opening thus formed. A vertical transverse partition 20 divides the opening into two parts, that part of the opening toward the center of the furnace having free access to the interior of the port-covering, while that part behind the plate 20 is cut off therefrom. Water outlet pipes 21 run from the forward lower corners of the side walls of the covering endwise and up into the outer part of the opening, that is, the part between the outer wall 18 and the partition 20. This space is provided with an outlet-pipe 22 below the level normally maintained by the incoming water. A complete and rapid circulation of water through the port-covering is thus provided, the cool water entering the opening, passing down through the side walls, and finally becoming heated at the extreme forward lower corners. The water heated at that point enters the pipes 21 and rises through them, and a rapid circulation takes place. Other pipe connections shown may be employed for cleaning out purposes, those which are essential in operation having been described.

My furnace embodies, in addition to the parts above described, an improved bulkhead in the gas down-take. This is shown at 23. It is made in the form of a hollow metal box, water-cooled, its water being supplied in any suitable manner, as by the pipes 24, 25. This bulkhead differs from the one which I have previously invented and patented, in that its front surface, that is, that facing on the gas down-take, is inclined upward and backward from the vertical. This construction is advantageous because the small particles of slag necessarily carried by the outgoing gases will lodge on this bulkhead and very soon cover it with a layer of refractory material, and it is thus unnecessary to employ a brick lining, although, if desired, a very thin layer of clay brick may be employed, to which the slag will very soon add itself and form the desired refractory coating.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

What I claim as new and desire to secure by Letters Patent is:

1. An open-hearth furnace having a basic bottom, gas and air up-takes at its ends, blocks extending upward and toward the ends of the furnace from the hearth-line and provided with longitudinal channels for the gas-ports, a hollow water-cooled port-covering overlying the top of the ports and depending on the two sides thereof and presenting its bare metal surface to the gas throughout the length of the ports and on the top and two sides thereof and protecting the material of the block from the destructive action of the flame.

2. An open-hearth furnace having a basic bottom, gas and air up-takes at its two ends, blocks of acid material extending from the hearth-line upward and toward the end walls of the furnace, said blocks being provided with central longitudinal channels to serve as gas-ports, and hollow water-cooled metal port-coverings extending over the channels and downward on the sides thereof and presenting throughout the length of the ports their bare metal surfaces on the top and both sides whereby the material of the block is protected from the destructive action of the flame and slag.

3. An open-hearth furnace having a basic bottom, gas and air up-takes at the ends, blocks of acid material extending upward from the hearth-line and outward toward the ends of the furnace and having their faces adjacent to the hearth-line faced with non-acid material and having central longitudinal channels in their upper surfaces to serve as gas-ports, the bottoms of said channels being filled with non-acid material, and hollow water-cooled metal port-coverings extending across said channels and down on the two sides thereof from end to end and presenting their bare metal surfaces to the port on the top and both sides.

4. An open-hearth furnace having a basic bottom, gas and air up-takes at its ends, blocks extending upward and toward the ends of the furnace from the hearth-line and provided with longitudinal channels to serve as gas-ports, a hollow water-cooled port-covering overlying the top of the ports and depending to form the two sides thereof, and inclosing with its bare metal interior walls a port of requisite size and shape to maintain proper combustion in the furnace, and serving to protect the material of the block from the destructive action of the flame.

5. An open-hearth furnace provided with a gas-port and a gas down-take, and a water-cooled bulkhead in the upper end of the outer wall of the gas down-take immediately below the entrance of the port thereto, the bulkhead having an inclined surface to collect and hold slag particles.

6. An open-hearth furnace having a basic hearth, blocks extending therefrom and upward and toward the end of the furnace and provided with longitudinal channels to serve as gas ports, hollow metal water-cooled port-coverings, U-shaped in cross-section, mounted within the channels in the blocks and presenting their inner faces to the sides and top of the gas-port and protecting the material of the block from the destructive action of the flame, openings at the outer ends of the port-coverings to receive water, and pipes running from the inner lower corners of the coverings upward and outward to the ends of the coverings.

7. An open-hearth furnace provided with a hearth, air and gas down-takes, blocks extending upward from the hearth-line and toward the end walls of the furnace, the blocks being provided with central longitudinal channels to serve as gas-ports, hollow metal water-cooled port-coverings, U-shaped in cross-section, set in the block channels and inclining downwardly toward the hearth and presenting their inner surfaces to the sides and top of the gas-port and protecting the material of the block from the destructive action of the flame, the coverings being open at their upper outer ends to receive a water-supply and having pipes running from their inner lower corners upward and outward to the outer ends of the coverings to discharge the water.

8. An open-hearth furnace provided with a passage at its end through which the products of combustion emerge, a down-take connected with said passage, and a water-cooled bulkhead in the upper end of the outer wall of said down-take immediately below the entrance of the port thereto, said bulkhead having a surface inclined upward and backward from the furnace to collect and hold slag particles carried by the outgoing products of combustion.

THOMAS S. BLAIR, Jr.